(12) United States Patent
Hurwitz

(10) Patent No.: US 8,057,445 B2
(45) Date of Patent: Nov. 15, 2011

(54) DIRECT DELIVERY APPLICATOR ASSEMBLY AND METHOD OF USE

(75) Inventor: Marni Markell Hurwitz, Far Hills, NJ (US)

(73) Assignee: I Did It, Inc., Far Hills, NJ (US)

( * ) Notice: Subject to any disclaimer, the term of this patent is extended or adjusted under 35 U.S.C. 154(b) by 471 days.

(21) Appl. No.: 12/286,811

(22) Filed: Oct. 2, 2008

(65) Prior Publication Data
US 2010/0087790 A1    Apr. 8, 2010

(51) Int. Cl.
*A61M 35/00* (2006.01)
(52) U.S. Cl. ........................................ 604/289
(58) Field of Classification Search ............ 604/289, 604/290; 119/603, 605, 650
See application file for complete search history.

(56) References Cited

U.S. PATENT DOCUMENTS

| | | | |
|---|---|---|---|
| 4,183,328 A | 1/1980 | Lawrence | 119/650 |
| 4,213,423 A | 7/1980 | Bryan et al. | 119/605 |
| 4,958,596 A | 9/1990 | Belan | 119/603 |
| 5,183,006 A * | 2/1993 | Robinson | 119/603 |
| 5,911,196 A | 6/1999 | Simmons et al. | 119/651 |
| 7,000,618 B2 * | 2/2006 | Dovergne et al. | 132/116 |
| 7,192,212 B2 | 3/2007 | Gutberlet et al. | 401/174 |

* cited by examiner

*Primary Examiner* — Melanie Hand
(74) *Attorney, Agent, or Firm* — Ernest D. Buff; Ernest D. Buff & Associates, LLC; Margaret A. Lacroin, Esq.

(57) ABSTRACT

An applicator directly delivers one or more active ingredients, such as flea, tick, or insect repellant to an animal's skin. The applicator comprises an applicator base connected to an applicator head having at least on prong member constructed with an internal channel therein in communication with a delivery aperture. A separately presented cartridge having a solution tube is appointed to be removably received within the applicator's base which, in turn is uniquely sized and shaped to receive a preselected one of those cartridges currently sold under recognized medicament brands. As the cartridge is squeezed, the solution traverses from the cartridge and applicator base into the applicator head and through the internal channels of the prong members, exiting through the delivery apertures onto the animal. Improved delivery owing to the prong members with channels therein terminating at fine delivery apertures is provided to yield direct delivery of the solution onto the animal's skin local to the fur shafts for a clean application and accurate dispersion of solution onto the animal.

19 Claims, 4 Drawing Sheets

DIRECT DELIVERY APPLICATOR ASSEMBLY AND METHOD OF USE

BACKGROUND OF THE INVENTION

1. Field of the Invention

The present invention relates to a direct delivery applicator assembly, and method of using same, for delivery of a solution onto an animal's coat; and more particularly, to an applicator having a plurality of prong members with channels therein for delivery of a solution to an animal's skin wherein the applicator is appointed to receive and removably house a separate cartridge/vessel containing a flea, tick and/or other insect repellant or medicament solution.

2. Description of the Prior Art

When applying active solutions, such as flea, tick and/or other insect repellants or medicaments, to an animal's coat pet groomers and pet owners have avoided contact between their skin and the active solution. Many medicaments or flea, tick and insect repellant solutions offered on the market today are presented in containers or solution packets wherein, in use, the tip is broken off to expose an aperture that is placed in contact with the animal's skin at the roots of local fur follicles and poured/squeezed thereon. Often, it can be difficult to place the packet's aperture directly into the interstices of the fur as the animal tends to become nervous and squirms around. In such cases, the solution can become misplaced onto the animal's coat, causing inaccurate dispersion of the medicament or solution, as well as unwanted contact to the owner/groomer and even other pets.

Many applicators heretofore disclosed and utilized fail to yield an applicator that is adapted to receive a separate solution packet and directly deliver the solution to the skin of the animal's coat in proximity to the local fur roots. As a result, applicators heretofore disclosed cannot be readily utilized to deliver a solution packet to an animal's coat.

The majority of applicators provide a vessel appointed to house a solution therein, which is then delivered through a dispenser. For example: U.S. Pat. No. 4,183,328 to Lawrence discloses a dispenser applicator and flexible walled container assembly for applying liquid compositions to the skin of pet animals. An applicator is molded in the configuration of the kind of pet animal to be treated having hollow legs resembling the pet animal's legs forming coarse combing members to spread the animal's hair into furrows; U.S. Pat. No. 5,911,196 to Simmons, et al. discloses a portable self-medicating applicator device having a liquid container from which pesticide or other medicament can flow to an absorbent material at the periphery of the device such that animals which come in contact with the device have the liquid transferred to them; and U.S. Pat. No. 7,192,212 to Gutberlet, et al. discloses an application device for applying a liquid, gel-like or pasty cosmetic to the skin, comprising a container for the cosmetic, an applicator which is connected to the container via at least one supply channel, and a piston for delivery of the cosmetic towards the applicator. These devices do not provide optimal delivery at the follicle of the furs; rather application is directly on the surface of the fur or, at best on furrows of the fur. Moreover, these devices do not provide an applicator that is appointed for housing a separate, disposable solution packet or cartridge with a solution therein.

Other applicators generally provide a brush-like applicator wherein a portion of the applicator, usually the handle, houses a solution that is delivered to an applicator segment for delivery onto an animal's coat/person's hair. These applicators cannot be utilized in conjunction with delivering a separate, disposable solution packet to an animal's coat. For example: U.S. Pat. No. 4,213,423 to Bryan, et al. discloses a powder dispensing brush comprising a hollow elongate handle for receiving a medicated powder or flea control powder therein, and an applicator segment having a plurality of conical projections provided with a central vertical port through which powder is dispensed onto the fur of an animal; U.S. Pat. No. 4,958,596 to Belan discloses a pet grooming kit comprising an array of treatment liquids stored in flexible containers and a liquid applicator generally in the form of a brush adapted to be threadably connected to the flexible containers, the applicator being structured to receive liquid from the containers and disburse the liquid from the ends of bristles during brushing of an animal's coat; U.S. Pat. No. 7,000,618 to Dovergne, et al. discloses a device for applying a substance to the hair, comprising an applicator portion and a receptacle on which the applicator portion is fixed, the applicator portion having at least one delivery orifice and teeth arranged around a closed curve, the gaps between the teeth being such that they allow hairs to pass between the teeth while enabling the substance to be retained within the curve; and U.S. Pat. No. 5,183,006 to Robinson discloses a disposable applicator for dispensing liquid formulations to the undercoat and skin of animals, involving a substantially hermetically sealed applicator that dispenses liquid formulations to the coat and skin of the animal through a single row of applicator prongs adapted to comfortably move through the animal's coat and along the skin controlled by the pressure from the user's hand; once the liquid formulation is dispensed, the applicator is discarded. None of these applicator devices provide an applicator that is appointed for receiving and housing a separate, pre-existing solution packet or cartridge therein to provide optimal delivery of the solution to an animal's coat with accuracy and minimal contact on the groomer's/owner's skin during application.

There remains a need in the art for an easy-to-use applicator that delivers one or more active ingredients, such as flea, tick, or insect repellant to an animal's skin local to the roots of hair and/fur therein. Also needed is a direct delivery applicator that is appointed to removably receive a cartridge or solution packet therein for accurate and clean delivery onto the animal's skin and interstices of the fur. It would further be desirable if the direct delivery applicator included at least one prong having an inner channel and prong aperture therein, wherein the prong is constructed having an appropriate length so that the prong's aperture substantially contacts the animal's skin beneath the fur so the active ingredients is directly delivered onto the animal's skin for a clean application and accurate dispersion of the medicament or active ingredients onto the animal.

SUMMARY OF THE INVENTION

The present invention provides an easy-to-use applicator that delivers one or more active ingredients, such as flea, tick, or insect repellant directly to an animal's skin local to the roots of hair and/fur. The direct delivery applicator is appointed to removably receive a cartridge or solution packet therein for accurate and clean delivery onto the animal's skin and interstices of the fur. At least one prong member having an internal channel and prong/delivery aperture is constructed within the direct delivery applicator. The prong is constructed having an appropriate length so that the prong's delivery aperture substantially contacts the animal's skin beneath the fur. With this construction, the active ingredients are directly delivered onto the animal's skin affording a clean application and accurate dispersion of the medicament or active ingredients onto the animal.

The direct delivery applicator for delivering a solution directly to an animal's skin comprises an applicator base attached to an applicator head. The applicator base includes an empty chamber having a top surface with a first opening and bottom surface traversing into a canal. The applicator head includes an applicator orifice aligned with the canal of the chamber. At least one prong member having an internal channel therein with a delivery aperture being associated and aligned with the applicator orifice is constructed within the applicator head. A cartridge having a cartridge aperture and a solution compartment housing a solution therein is appointed to be received within the first opening and removably housed within the chamber of the applicator base so that the cartridge aperture is aligned with the applicator orifice of the applicator head. In this manner, delivery of the solution through the delivery aperture of the internal channel of the prong members onto the animal's coat is accomplished. Pressing on the solution compartment of the cartridge causes the solution to travel through the internal channel of the prong and onto the animal's skin.

A method of constructing a direct delivery applicator for delivering a solution to an animal's skin is provided. The method includes the first step of forming an applicator base having a chamber comprising a top surface with a first opening and bottom surface traversing into a canal, wherein a cartridge having a cartridge aperture and a solution compartment housing a solution therein is appointed to be received within the first opening and removably housed within the chamber of the applicator base when the applicator is to be used. Next, an applicator head having an applicator orifice and being aligned with the internal canal of the chamber is formed. The method also includes the step of forming at least one prong member having an internal channel therein with a delivery aperture and integrating the prong member onto the applicator head so that the prong member is aligned with the applicator orifice. Lastly, the method involves attaching the applicator head to the applicator base, wherein during use and placement of the cartridge within the chamber of the applicator base the cartridge aperture is aligned with the applicator orifice of the applicator head for delivery of the solution through the delivery aperture of the internal channel of the prong member onto the animal's coat. During use, pressing on the solution compartment of the cartridge causes the solution to travel through the internal channel of the prong and onto the animal's skin.

BRIEF DESCRIPTION OF THE DRAWINGS

The invention will be more fully understood and further advantages will become apparent when reference is had to the following detailed description, appended claims, and accompanying drawings, in which:

FIG. 2b is a cross-sectional view of the prong members, showing an embodiment of the delivery aperture and construct of the prong member taken along line VI of FIG. 2a;

FIG. 2c is a cross-sectional view of the prong members, showing an embodiment of the delivery aperture and construct of the prong member taken along line M of FIG. 2a;

FIG. 2d is a cross-sectional view of the prong members, showing an embodiment of the delivery aperture and construct of the prong member taken along line X of FIG. 2a.

DESCRIPTION OF THE PREFERRED EMBODIMENTS

The arrangement provides for a direct delivery applicator that delivers one or more active ingredients, such as flea, tick, or insect repellant to an animal's skin local to the roots of hair and/or fur. Improved delivery owing to a plurality of prong members with channels therein terminating at delivery apertures is provided to yield direct delivery of a medicament solution to the animal's skin, beneath the fur and local to the fur shafts or roots. A separately sold cartridge is appointed to be removably received within the applicator's base. Clean delivery of the medicament is achieved, and the cartridge merely removed from the applicator and discarded after the solution is exhausted, while the applicator is duly ready for another use or application with minimal cleaning.

The prong members have fine delivery apertures therein and may be attached to the applicator head in numerous ways. The prong members may be molded together by injection molding or similar processes, as a unitary body having a comb like arrangement. In a second embodiment, the prong members may comprise delivery apertures that are U shaped so that the apertures not only bring the liquid or solution to the tip of the prongs, but also deliver the liquid or solution along the length of the prongs. In this embodiment, at least some, and preferably each, of the prong members delivers the solution along its entire length and any hairs or fur of the coat contacting the prong members are coated with the solution. The liquid solution containing perfume, fragrance or active ingredient has a contact angle sufficiently low, typically in the range of 1 to 30 degrees with respect to the prong member material so that the liquid penetrates the fine delivery/prong apertures provided within the prong members. If the contact angle is significantly larger, the penetration of the liquid solution within the fine apertures of the prong members is compromised.

The direct delivery applicator is advantageous in that a cartridge, such as the solution tube sold by Frontline® for use on dogs and cats, fits uniquely into the applicator's base/housing. A differently shaped applicator base/housing would be used for the Sargents® solution tube (which has a distinctly different shape than the Frontline® solution tube). Once inserted into the applicator base/housing, medicament in the solution tube can be transferred through the cylindrical prong members at the end of the applicator head and onto a household pet. The person administering the Frontline® medicament simply presses on the topside of the solution tube, causing medicament to travel through channels in the prong members and onto the skin of the pet. Owing to the length of the prong members and the applicator's construction, the medicament is transferred directly to the animal's skin.

Figure 1A:
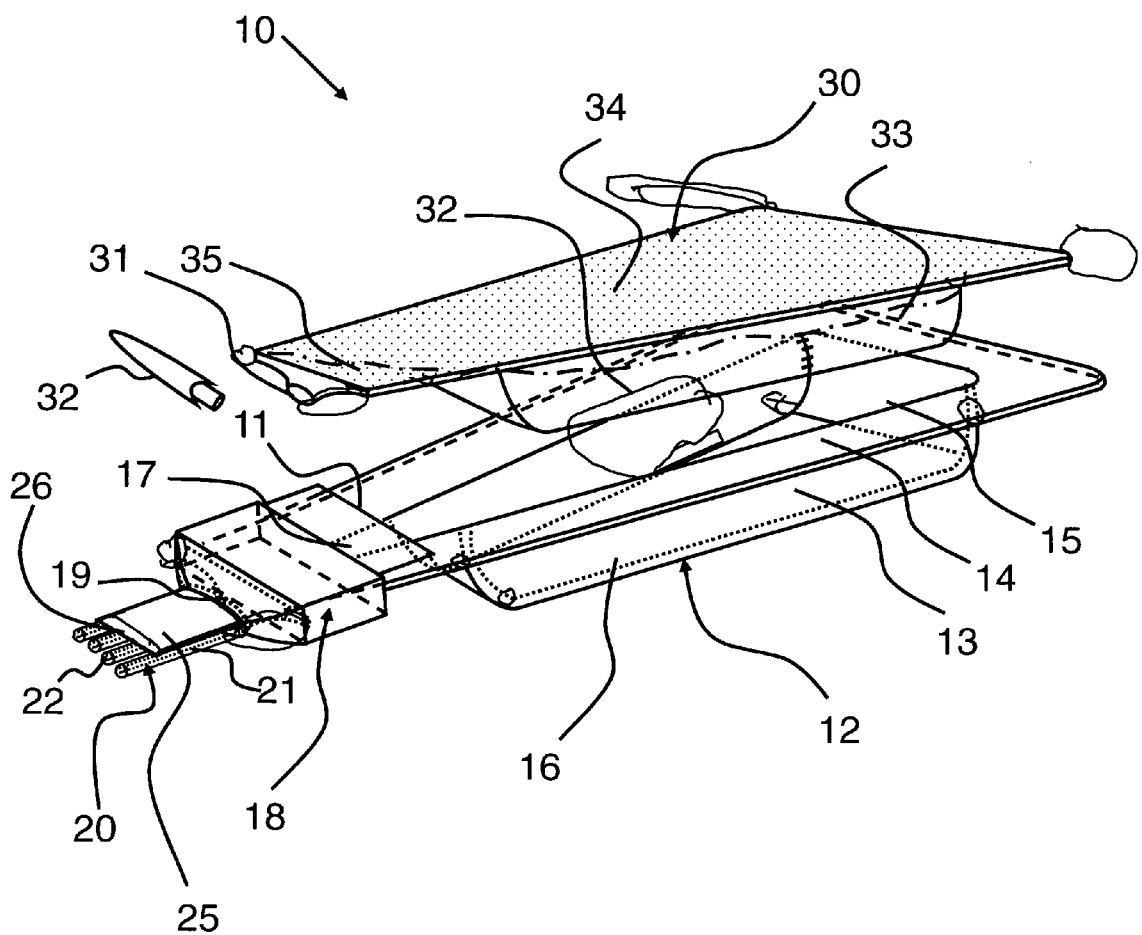
FIG. 1a is a schematic view depicting a first embodiment of the direct delivery applicator assembly, showing the solution tube/solution packet housing medicament or active ingredients being placed within the applicator housing.
Figure 1B:
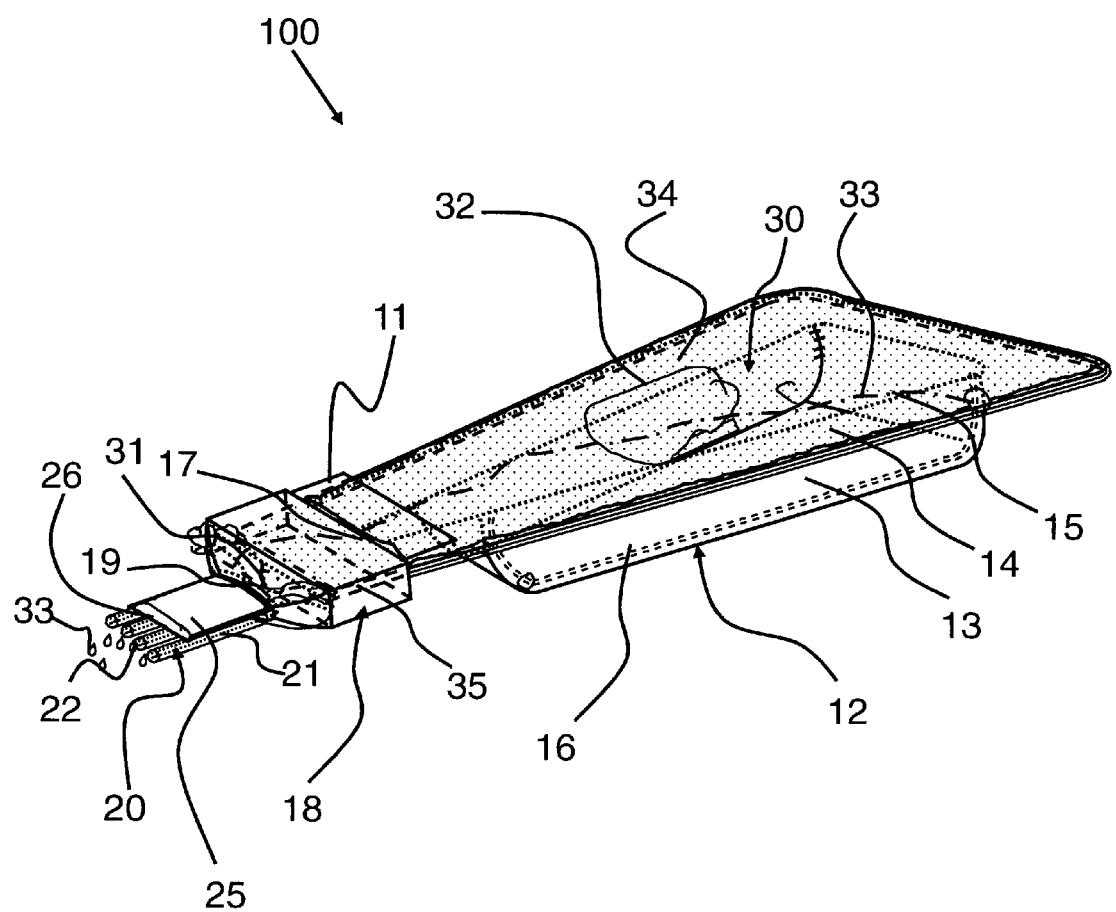
FIG. 1b is a schematic view the direct delivery applicator assembly wherein the cartridge/solution tube housing medicament or active ingredients is accommodated within the applicator housing and appointed for application of force for delivery of the medicament or active ingredients onto an animal's coat or hair.

FIGS. 1a and 1b show schematic views depicting a first embodiment of the direct delivery applicator assembly: (i) FIG. 1a is a schematic view showing the solution tube/solution packet housing medicament or active ingredients being placed within the applicator housing, shown generally at 10; and (ii) FIG. 1b is a schematic view showing the cartridge/solution tube housing medicament or active ingredients accommodated within the applicator housing and appointed for application of force for delivery of the medicament or active ingredients onto an animal's coat or hair, shown generally at 100. Direct delivery applicator 10 is generally constructed of a light weight polymeric material (but the material can vary as needed) and is appointed to removably receive a cartridge 30, such as that currently offered on the market by Frontline® or Sargents®, for delivering a solution to an animal's skin. Direct delivery applicator 10 can come in different colors and shapes to accommodate a plethora of cartridge shapes currently offered on the market, and not yet offered. Direct delivery applicator 10 includes an applicator base 12 having a chamber 13 comprising a top surface 14 with a first opening 15 and bottom surface 16 traversing into a canal 17. Chamber 13 is appointed to receive cartridge 30 having a cartridge aperture 31 (typically, exposed after cartridge 30 is opened via breaking-off tip 32) on neck 35 and a solution compartment 32 housing a solution 33. Solution 33 preferably includes active ingredients such as insect repellant, flea repellant and treatment, tic repellant, conditioning compositions, dye compositions, moisturizing ingredients, or antibacterial compounds. Generally, cartridge 30 is composed of a flexible, deformable material on cartridge top 34 and virtually the entire body of cartridge 30, including solution compartment 32 so that, in application without the direct delivery applicator herein, cartridge 30 is opened to expose cartridge aperture 31 and is placed on the animal's body (i.e. between the shoulder blades at the base of the neck under the fur line onto the skin) and cartridge 30 is squeezed to release the solution 33. Unfortunately, it is often difficult to properly place the cartridge on the animal's back as the animal is often apprehensive and begins to squirm and attempt to escape. Oftentimes, this causes the solution to be applied improperly. The effectiveness of the solution is decreased as significant portions thereof inadvertently contact the wrong parts of the animal; or the person applying the solution; or other pets, persons or furniture nearby.

In application of the applicator 10 herein, cartridge 30 is placed within first opening 15 and removably housed within chamber 13 of applicator base 12 until it is exhausted or otherwise no longer needed. Chamber 13 of applicator base 12 is shaped and constructed to fit a variety of differently sized and shaped cartridges 30. Chamber 13 of applicator base 12 may be composed of a rigid material, or alternatively may be composed of a flexible deformable material so that chamber 13 can be squeezed to apply enhanced pressure on solution compartment 32 of cartridge 30 to facilitate release of solution 34 from cartridge 30. Otherwise, pressure is only exerted on the flexible solution compartment 32 of cartridge 30. The optional flexible deformable material utilized for chamber 13 may be composed of rubber having a thickness in the range of 1/32 inch to 3/32 inch. Optionally, the flexible deformable material utilized for chamber 13 may be composed of a flexible polymeric material having a thickness in the range of 1/32 inch to 3/32 inch.

Direct delivery applicator 10 further includes an applicator head 18 having an applicator orifice 19 aligned with canal 17 of chamber 13. In placing cartridge 30 within chamber 13, cartridge 30 is preferably angled slightly upward (so that solution 33 does not escape from opened cartridge aperture 31) and cartridge aperture 31 and neck 35 of cartridge 30 is aligned with applicator head 18. Cartridge neck 35 (and visa vie cartridge aperture 31) is slid into applicator head 18 so that cartridge aperture 31 abuts applicator orifice 19 and neck 35 of cartridge 30 traverses and rests in canal 17, keeping the tube in a stationary position while being used, and applied to the animal. Solution compartment 32 is inserted into first opening 15 to rest within the confines of chamber 13. A flap 11 is preferably provided on top surface 14 of applicator base 12 for securing cartridge 30 within applicator 10, in this manner, flap 11 may also be flexible so that force may be applied to flap 11 to facilitate squeezing of solution compartment 32 of cartridge 30 to force solution 33 therefrom. Preferably, applicator head 18 has a chamber or holding cavity in the front portion that keeps the medicament from escaping (as is best depicted in FIG. 3, discussed later herein).

At least one prong member 20 having an internal channel 21 therein with a delivery aperture 22 is associated and aligned with applicator head 18 for delivery of solution 33 through delivery aperture 22 onto an animal's coat. Preferably, direct delivery applicator 10 includes a shield 25 extending from applicator head 18 over a portion of prong members 20. Shield 25 may optionally be constructed having a toothed edge (at edge 26) so that a miniature comb is provided on edge 26 of shield 25. When prong members 20 are placed on an animal to lift the animal's hair away from the portion of the animal's skin to be contacted by medicament, it is desirable that a minimal amount of fur/hair slip back through the prong members 20, which themselves resemble teeth of a comb. As the hair is lifted using the prong members 20 to apply solution 33, the shade/shield 25 goes over prongs 20 and holds the hair up and away from the skin, facilitating delivery of solution 33 to the skin. In this way, the person applying solution 33 can clearly see how much solution 33 is being applied to the skin of the animal. This eliminates having to push the hair aside while applying solution 33. The shield separates hair from the prong members 20, enabling the user to better discern the amount of fluid dispensed to the skin of the animal.

Figure 2A:
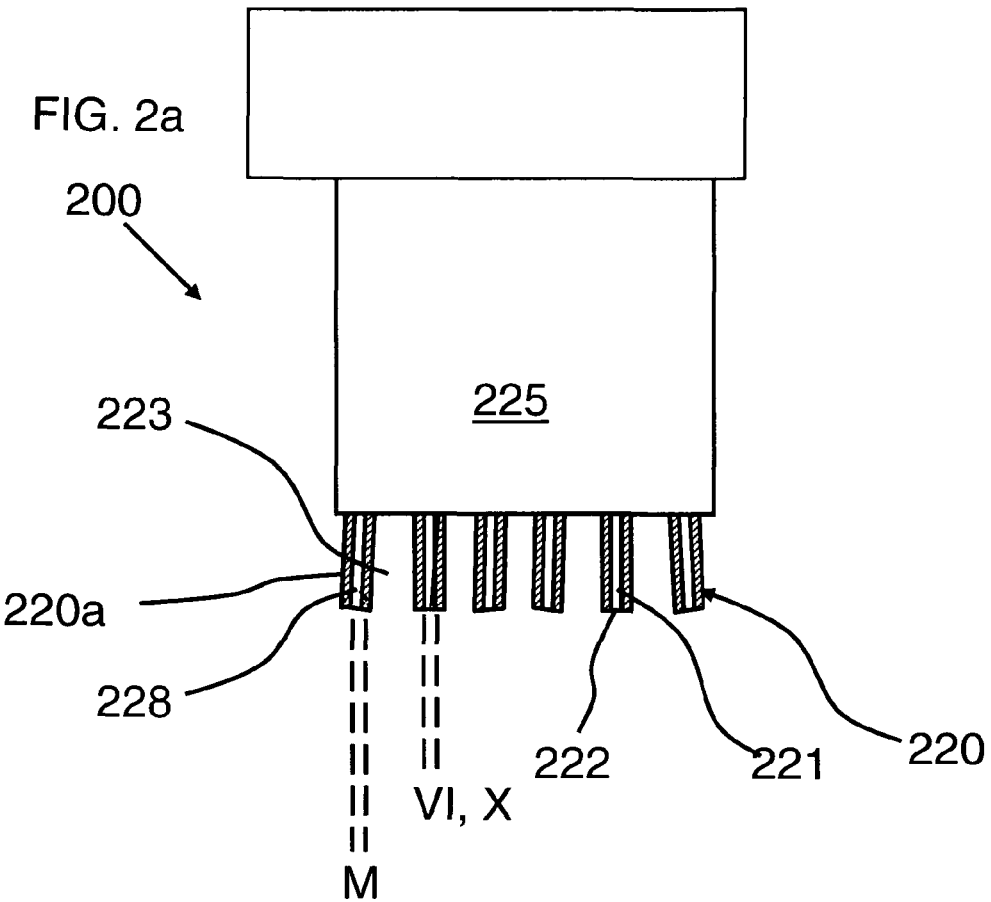
FIG. 2a is a top elevation view of the prong members with the optional shield applied thereon.
Figure 2B:
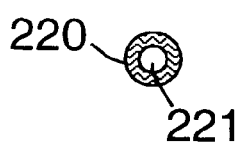
Figure 2C:
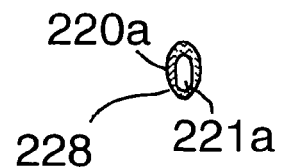
Figure 2D:
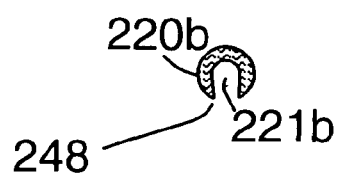

FIGS. 2a-2d illustrate views of prong members (20 in FIGS. 1a and 1b), showing different embodiments thereof, wherein: FIG. 2a is a top elevation view of the prong members with the optional shield applied thereon, shown generally at 200; FIG. 2b is a cross-sectional view of the prong members, showing an embodiment of the delivery aperture and construct of the prong member taken along line VI of FIG. 2a; FIG. 2c is a cross-sectional view of the prong members, showing an embodiment of the delivery aperture and construct of the prong member taken along line M of FIG. 2a; and FIG. 2d is a cross-sectional view of the prong members, showing an embodiment of the delivery aperture and construct of the prong member taken along line X of FIG. 2a. Prong members 220 are shown with shield 225 thereabove. Prong members 220 are constructed having internal channel 221 with a delivery aperture 222 for delivery of the solution onto the animal's coat. Prong members 220 have gaps 223 thereinbetween so that the arrangement of prong members 220 resembles a comb type configuration. The prong members 220 are gapped to act as teeth (comb) to help in separating and lifting the hair for direct contact of solution (i.e. Frontline®) medicament. Pressing on the solution compartment of the cartridge causes the solution to travel through internal channels 221 of prongs 220 and onto the animal's skin. Preferably, there are at least three prong members 220, more preferably, there are at least six prong members 220; but can range from as few as 3 to as many as ten or more. Prong members 220 function to separate the solution and disburse it with a degree of directionality that prevents the solution 0 from puddling on the back of the animal. Prong members 220 preferably have an elongated cylindrical shape having a length ranging from 1 cm (0.394 inches) to 10 cm (3.94 inches) for direct transfer of said solution onto said animal's skin. The length of prong members 220 is constructed having an appropriate length so that the prong's aperture 222 substantially contacts the animal's skin beneath the fur so the active ingredients is directly delivered onto the animal's skin for a clean application and accurate dispersion of the medicament or active ingredients onto the animal. Preferably, each prong member 220 has a circular cross section as taken along line VI and depicted in FIG. 2*b*, the diameter of which ranges from 0.001 inch to 0.060 inch. Optionally, the diameter may range from 0.005 inch to 0.040 inch. The diameter of the channel 221 and visa vie delivery aperture 222 facilitates optimal flow of the solution out of the prong members 220 and onto the animal. Alternatively, each prong member 220 may comprise an angled tip as is shown at 228 on demarcated prong member 220*a* having channel 221*a* depicted in FIG. 2*c*. In this manner, angled tip 228 provides enhanced direct contact onto the animal's skin. In another embodiment, each prong member 220*b* has a circular cross section with a central aperture 221*b* and a slit 248 along the length of the prong member 220*b* forming a prong having a U-shaped cross section. With this embodiment, active ingredients are delivered directly to both the skin and coat of the animal.

Figure 3:
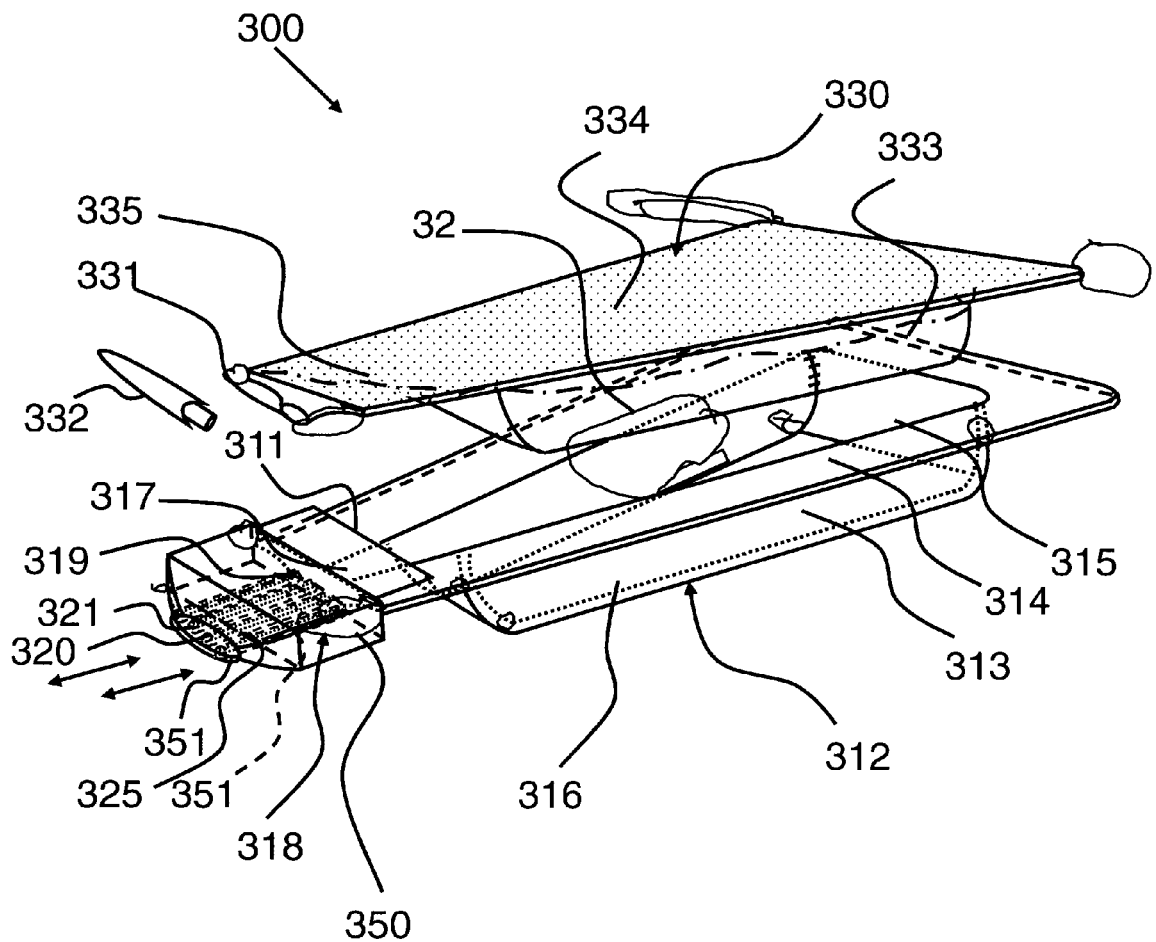
FIG. 3 is a schematic view depicting another embodiment of the direct delivery applicator assembly wherein a holding cavity is provided in the applicator head and the shield and prong member are retractable within the holding cavity, while showing the solution tube/solution packet housing medicament or active ingredients being placed within the applicator housing.

In a preferred embodiment, the teeth of the comb are retractable as shown in FIG. 3. FIG. 3 shows a schematic view depicting another embodiment of the direct delivery applicator assembly, generally at 300. Direct delivery applicator 310 is appointed to removably receive a cartridge 330. Direct delivery applicator 310 includes an applicator base 312 having a chamber 313 comprising a top surface 314 with a first opening 315 and bottom surface 316 traversing into a canal 317. Chamber 313 is appointed to receive cartridge 330 having a cartridge aperture 331 (typically, exposed after cartridge 330 is opened via breaking-off tip 332) on neck 335 and a solution compartment 332 housing a solution 333. Cartridge 330 is placed within first opening 315 and removably housed within chamber 313 of applicator base 312 until it is exhausted or otherwise no longer needed. Direct delivery applicator 310 further includes an applicator head 318 having an applicator orifice 319 aligned with canal 317 of chamber 313. A flap 311 is preferably provided on top surface 314 of applicator base 312 for securing cartridge 330 within applicator 310. At least one prong member 320 having an internal channel 321 therein with a delivery aperture 322 is associated and aligned with applicator head 318 for delivery of solution 333 through delivery aperture 322 onto an animal's coat. Preferably, direct delivery applicator 310 includes a shield 325 extending from applicator head 318 over a portion of prong members 320. Shield 325 essentially acts like a cowcatcher, enabling the hair to be pushed upwardly and not fall back through prong members 320.

In this embodiment, applicator head 318 has a chamber or holding cavity 350 that keeps medicament from escaping (as touched upon in the discussion of FIGS. 1*a* and 1*b* hereinabove). As constructed, in this embodiment aperture orifice 319 is located within application head 318 in a manner to form the separate holding cavity 350. Holding cavity 350 includes a cavity orifice 351 which solution 333 passes through to travel into internal channels 321 of prong members 320. When placing cartridge 330 within chamber 313, cartridge aperture 331 and neck 335 of cartridge 330 are aligned with applicator head 318 so that cartridge aperture 331 feeds into applicator orifice 319 for delivery of solution 333 into holding cavity 350. Cartridge neck 335 (and visa vie cartridge aperture 331) is slid into applicator head 318 so that cartridge aperture 331 abuts applicator orifice 319 and neck 335 of cartridge 330 traverses and rests in canal 317, keeping the tube in a stationary position while being used, and applied to the animal. Holding cavity 350 helps prevent the solution 333 from escaping applicator 310 as solution 333 is squeezed from solution compartment 332 of cartridge 330 at a rapid rate. As solution 333 pools in holding cavity 350, it enters into internal channels 321 of prong members 320 and is dispersed through delivery apertures 322 onto the animal's skin.

Moreover, as depicted in FIG. 3, preferably prong members 320 and shield 325 are retractable so that the risk of injury or breakage during storage or transport is mitigated. As indicated shield 325 (where applicable) and prong members 320 are retractable directly within either holding cavity 350, or a separate retraction cubby 351 may be provided that is sealed away from holding cavity 350. Wherein shield 325 and prong members 320 retract directly into holding cavity 350, a door or cap may be included that hingedly closes to substantially seal off holding cavity 350 and prevent particles from entering therein, or leakage of remnant solution. This retractable feature enables the applicator to be carried about safely, without fear that the prong members 320 will be broken off or cause injury to the user. Alternatively, prong members 320 and shield 325 may include a pivot means so that they can be folded instead of retracted during non-use and storage. Where shield 325 is not provided on applicator 310, prong members 320 may solely be retractable or pivotal for optimal storage.

Significant advantages are realized by practice of the present invention. The key features of the direct delivery applicator and advantages derived therefrom include, in combination, the features and advantages set forth below:

1) an applicator base having a chamber comprising a top surface with a first opening and bottom surface in communication with an internal canal;

2) an applicator head having an applicator orifice and being aligned with the internal canal of the chamber;

3) at least one prong member, and preferably a plurality of prong members, each of which has an internal channel therein with a fine delivery aperture, associated and aligned with the applicator orifice;

4) a cartridge having a cartridge aperture and a solution compartment housing a solution therein, the chamber of the applicator base being appropriately sized and shaped so that the cartridge is received within the first opening thereof and is removably housed therewithin, the cartridge aperture being aligned with the applicator orifice of the applicator head for delivery of the solution through the delivery aperture of the internal channel of the prong member onto the animal's coat;

5) pressing on the solution compartment of the cartridge causes the solution to travel through the internal channel of the prong and onto the animal's skin;

6) the person administering the solution of the cartridge need not worry about parting the animal's hair;

7) the person administering the solution can lift the hair and simply apply pressure to the cartridge or solution package itself to force the solution through the applicator's prong members;

8) the prong members allow the liquid to be dispensed directly to the skin;

9) the applicator can be used many times, while the cartridge containing solution is readily discarded;

10) the applicator may be constructed with a size and shape that uniquely accommodates a preselected type of those cartridges currently on the market, including solution tubes or cartridges by Frontline® and Sargents® without having to touch the medicament; and 11) the applicator can be continuously re-used with cartridges of Frontline® being replaced without fear of admixing different solutions and consequent cross-contamination that might otherwise be produced if the size and shape of the applicator base chamber accommodated more than one cartridge currently sold under recognized medicament brands (for example both Frontline® and Sargents®), so that the user can readily discern the solution being delivered to the animal's coat and be certain of the medicament being spread.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed is:

1. A direct delivery applicator for delivering a solution to an animal's skin, comprising:
   a. an applicator base having a chamber comprising a top surface with a first opening and bottom surface traversing into a canal, said chamber being appointed to receive a cartridge having a cartridge aperture and a solution compartment housing a solution, said cartridge being appointed to be received within said first opening and removably housed within said chamber of said applicator base;
   b. an applicator head having an applicator orifice and being aligned with said canal of said chamber;
   c. at least one prong member having an internal channel therein with a delivery aperture being associated and aligned with said applicator head, said cartridge aperture of said cartridge appointed to be aligned with said applicator orifice of said applicator head for delivery of said solution through said delivery aperture of said internal channel of said prong member onto said animal's coat;
   d. said chamber of said applicator base being composed of a flexible deformable material so that said chamber can be squeezed to apply enhanced pressure on said solution compartment of said cartridge to facilitate release of said solution from said cartridge and through said prongs; and
   e. said flexible deformable material being composed of rubber having a thickness in the range of 1/32 inch to 3/32 inch;
   wherein pressing on said solution compartment of said cartridge causes said solution to travel through said internal channel of said prong and onto said animal's skin.

2. A direct delivery applicator as recited by claim 1, wherein said chamber of said applicator base is configured with a size and shape that uniquely fits a preselected one of a variety of different sized and shaped cartridges.

3. A direct delivery applicator as recited by claim 1 comprising a holding cavity located within said applicator head being appointed to receive said solution as it travels down said canal from said cartridge housed within said chamber of said applicator base.

4. A direct delivery applicator as recited by claim 1, comprising at least three prong members.

5. A direct delivery applicator as recited by claim 4, comprising at least six prong members.

6. A direct delivery applicator as recited by claim 1, wherein each of said prong member comprises an angled tip associated with said applicator orifice.

7. A direct delivery applicator as recited by claim 1, wherein said prong members have an elongated cylindrical shape.

8. A direct delivery applicator as recited by claim 1, wherein said prong members have a length ranging from 1 cm (0.394 inches) to 10 cm (3.94 inches) for direct transfer of said solution onto said animal's skin.

9. A direct delivery applicator as recited by claim 1 comprising a shield extending from said applicator head over a portion of said prong members.

10. A direct delivery applicator as recited by claim 9, wherein said shield comprises a toothed edge.

11. A direct delivery applicator as recited by claim 9, wherein said prong members and said shield are retractable into said applicator head.

12. A direct delivery applicator as recited by claim 1, wherein said prong members are retractable into said applicator head.

13. A direct delivery applicator as recited by claim 1, wherein each of said prong members has a circular cross section, the diameter of which ranges from 0.001 inch to 0.060 inch.

14. A direct delivery applicator as recited by claim 13, wherein each of said prong members has a circular cross section, the diameter of which ranges from 0.005 inch to 0.040 inch.

15. A direct delivery applicator as recited by claim 1, wherein each of said prong members has a circular cross section with a central aperture and a slit along the length of the prong member forming a prong having a U-shaped cross section.

16. A direct delivery applicator as recited by claim 1 being composed of a light weight polymeric material.

17. A direct delivery applicator as recited by claim 1, wherein said solution of said cartridge includes active ingredients such as insect repellant, flea repellant and treatment, tic repellant, conditioning compositions, dye compositions, moisturizing ingredients, or antibacterial compounds.

18. A direct delivery applicator as recited by claim 1 comprising a flap located between said top surface of said applicator base and said applicator head for securing said cartridge within said direct delivery applicator.

19. A direct delivery applicator as recited by claim 1, wherein said prong members include a pivot means so that same can be folded during non-use for compact storage of said direct delivery applicator.

* * * * *